United States Patent
Schmidt et al.

(10) Patent No.: US 12,264,569 B2
(45) Date of Patent: Apr. 1, 2025

(54) METHOD AND MATERIALS FOR MANIPULATING HYDRAULIC FRACTURE GEOMETRY

(71) Applicant: Quidnet Energy Inc., Houston, TX (US)

(72) Inventors: Howard K. Schmidt, Hockley, TX (US); Scott Wright, Houston, TX (US); Dmitry Kosynkin, Houston, TX (US)

(73) Assignee: Quidnet Energy, Inc., Houston, TX (US)

( * ) Notice: Subject to any disclaimer, the term of this patent is extended or adjusted under 35 U.S.C. 154(b) by 0 days.

(21) Appl. No.: 18/383,188

(22) Filed: Oct. 24, 2023

(65) Prior Publication Data

US 2024/0068347 A1    Feb. 29, 2024

Related U.S. Application Data

(63) Continuation of application No. 17/741,398, filed on May 10, 2022, now Pat. No. 11,795,802, which is a continuation of application No. 17/145,666, filed on Jan. 11, 2021, now Pat. No. 11,326,435.

(51) Int. Cl.
*C09K 8/80* (2006.01)
*C09K 8/68* (2006.01)
*E21B 43/27* (2006.01)

(52) U.S. Cl.
CPC .............. *E21B 43/27* (2020.05); *C09K 8/685* (2013.01); *C09K 8/80* (2013.01)

(58) Field of Classification Search
CPC ............ E21B 43/27; C09K 8/685; C09K 8/80
See application file for complete search history.

(56) References Cited

U.S. PATENT DOCUMENTS

| | | | |
|---|---|---|---|
| 3,612,608 A | 10/1971 | Manker et al. | |
| 4,311,340 A | 1/1982 | Lyons et al. | |
| 4,532,052 A | 7/1985 | Weaver et al. | |
| 5,259,453 A | 11/1993 | Johnston | |
| 5,735,349 A | 4/1998 | Dawson et al. | |
| 7,547,665 B2 | 6/2009 | Welton et al. | |
| 11,073,008 B2 | 7/2021 | Hardage et al. | |
| 2004/0244978 A1 | 12/2004 | Shaarpour | |
| 2006/0124309 A1* | 6/2006 | Nguyen | E21B 43/114 |
| | | | 166/308.2 |
| 2011/0005753 A1 | 1/2011 | Todd et al. | |
| 2011/0240297 A1 | 10/2011 | Lord et al. | |

(Continued)

FOREIGN PATENT DOCUMENTS

WO    2008143749 A1    11/2008

OTHER PUBLICATIONS

USPTO Non-Final Office Action for U.S. Appl. No. 17/145,666 dated Sep. 17, 2021.

(Continued)

*Primary Examiner* — Silvana C Runyan
(74) *Attorney, Agent, or Firm* — Tumey L.L.P.

(57) ABSTRACT

Materials for manipulating hydraulic fracture geometry. In one embodiment, the materials comprises a tip screen-out mixture, which comprises water; a hydrophilic polymer of anionic polyacrylamide, wherein the hydrophilic polymer is hydrolized at least in part; and one or more crosslinking agents selected from a group of compounds consisting of polyvalent metal cations.

10 Claims, 2 Drawing Sheets

(56) References Cited

U.S. PATENT DOCUMENTS

| | | |
|---|---|---|
| 2011/0298270 A1 | 12/2011 | Duyvesteyn |
| 2015/0027952 A1 | 1/2015 | Schmidt et al. |
| 2017/0284028 A1* | 10/2017 | Hietaniemi ............ D21H 11/14 |
| 2021/0062072 A1* | 3/2021 | Al-Muntasheri ........ C09K 8/92 |
| 2021/0222054 A1* | 7/2021 | Deysarkar .............. C09K 8/725 |
| 2022/0411591 A1* | 12/2022 | Scherman ............ C08G 83/008 |

OTHER PUBLICATIONS

USPTO Notice of Allowance for U.S. Appl. No. 17/145,666 dated Jan. 14, 2022.
USPTO Issue Notification for U.S. Appl. No. 17/145,666 dated Apr. 20, 2022.
USPTO Notice of Allowance for U.S. Appl. No. 17/741,398 dated Jun. 21, 2023.
USPTO Non-Final Office Action for U.S. Appl. No. 17/741,398 dated Jan. 6, 2023.
USPTO Issue Notification for U.S. Appl. No. 17/741,398 dated Oct. 24, 2023.
International Search Report and Written Opinion for Application No. PCT/US2023/033409 dated Feb. 21, 2024.

* cited by examiner

METHOD AND MATERIALS FOR MANIPULATING HYDRAULIC FRACTURE GEOMETRY

CROSS-REFERENCE TO RELATED APPLICATIONS

This application is a continuation of U.S. application Ser. No. 17/741,398 filed on May 10, 2022, which is a continuation of U.S. patent application Ser. No. 17/145,666 filed on Jan. 11, 2021 and issued as U.S. Pat. No. 11,326,435 on May 10, 2022, the disclosures of which are incorporated by reference herein in their entirety.

STATEMENT REGARDING FEDERALLY SPONSORED RESEARCH OR DEVELOPMENT

Not applicable.

BACKGROUND OF THE INVENTION

Field of the Invention

The present invention relates to a method for manipulating hydraulic fracture geometry in a rock matrix. More particularly, the present invention relates to a method for manipulating hydraulic fracture geometry in a rock matrix so as to optimize energy storage and power generation in a geomechanical pumped storage system, or alternatively improve mineral resource production.

Background of the Invention

In the oil and gas industry, the presence of hydraulic fractures in various rock formation matrices surrounding a well may be commonly encountered. For instance, hydraulic fractures may be deliberately generated in the course of producing unconventional hydrocarbon resources, or even accidentally created during drilling operations. In either case, some control over the fracture geometry of these hydraulic fractures may be desirable.

Currently, the extent to which an operator controls or manipulates hydraulic fracture geometry may be in the form of eliminating further propagation of a hydraulic fracture. In the case of a deliberately generated hydraulic fracture, propagation may be arrested when a proppant slurry becomes dehydrated during the fracturing process as a result of rock matrix leak-off. The resulting "tip screen-out" may increase fracture width near the well. This is usually unintentional, but may be exploited deliberately if the rock matrix permeability is known in advance. In the case of an accidentally created hydraulic fracture, further propagation may be eliminated by simply plugging the hydraulic fracture completely during the drilling process. Plugging may be achieved by filling the hydraulic fracture with lost circulation materials (LCMs) which may be included in the drilling fluid as a prophylactic or provided as a bolus or "pill" upon detection of the fracture. This manipulation of fracture geometry may be imperative so as to avoid a reduction in drilling efficiency, an increase in drilling expenses, or complete loss of the well.

Various methods and materials have been developed in the oil and gas field to effectively control or manipulate hydraulic fracture geometry, as it is a ubiquitous and long-standing issue. Most methods, as with the two cases above, involve filling all or most of the volume of the hydraulic fracture with more or less solid material to bridge the fracture, thereby stopping fluid flow and arresting further propagation of the fracture. Such methods are not suitable for selectively filling the tip of the fracture and leaving the bulk of the fracture open and useful for other purposes such as, without limitation, storing energy and generating power in a geomechanical pumped storage system or improving mineral resource production.

Consequently, there is a need in the art for a method for manipulating hydraulic fracture geometry in a rock matrix (e.g., selectively plugging or screening out hydraulic fracture tips) so as to optimize energy storage and power generation in a geomechanical pumped storage system, or alternatively improve mineral resource production.

BRIEF SUMMARY OF SOME OF THE PREFERRED EMBODIMENTS

These and other needs in the art are addressed in one embodiment by a method for manipulating hydraulic fracture geometry comprising: injecting a fracturing fluid into a well to generate one or more hydraulic fractures in a subsurface rock formation, wherein the subsurface rock formation surrounds the well; substantially draining any fluids from the one or more hydraulic fractures; injecting a hydrophilic polymer and one or more crosslinking agents into the well to subsequently form low-density hydrogels, wherein the low-density hydrogels screen out only each tip of the one or more hydraulic fractures; and injecting a working fluid into the well to increase fracture width of the one or more hydraulic fractures without substantially increasing fracture length.

These and other needs in the art are addressed in one embodiment by a method for manipulating hydraulic fracture geometry comprising: injecting a fracturing fluid into a well to generate one or more hydraulic fractures in a subsurface rock formation, wherein the subsurface rock formation surrounds the well; substantially draining any fluids from the one or more hydraulic fractures; injecting pre-formed particle gels (PPGs) into the well to screen out only each tip of the one or more hydraulic fractures, wherein the PPGs are particles of a hydrophilic polymer crosslinked by one or more crosslinking agents; and injecting a working fluid into the well to increase fracture width of the one or more hydraulic fractures without substantially increasing fracture length.

These and other needs in the art are addressed in one embodiment by a method for manipulating geometry of a hydraulic fracture, wherein the hydraulic fracture is disposed in a subsurface rock formation surrounding a well, comprising: substantially draining any fluids from the hydraulic fracture; injecting a tip screen-out (TSO) mixture into the well to screen out only the tip of the hydraulic fracture; and injecting a working fluid into the well to increase fracture width of the hydraulic fracture without substantially increasing fracture length.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Oil and gas wells may be capable of geomechanically storing energy and generating power. This may be achieved by using the energy obtained from an outside source to pump a fluid down a well comprising hydraulic fractures at substantially high pressures. Injecting the fluid may result in elastic deformation of a rock matrix surrounding the hydraulic fractures, thereby storing the energy used to deform the rock matrix as potential energy. The stored potential energy may then be recovered upon ejection of the fluid from the well, which may occur by allowing the rock matrix to relax to its original position. By this process, oil and gas wells may function as geomechanical pumped storage systems, or geomechanical batteries.

The performance of a geomechanical pumped storage system may be substantially dependent on the hydraulic fractures utilized by the system, and more particularly the geometry of the hydraulic fractures utilized by the system. For instance, the geometry of the hydraulic fractures may influence, without limitation, flow rate, reservoir pressure, and fluid storage capacity of the system, and thereby dictate the amount of power that may be generated and the amount of energy that may be stored. As such, an operator may need to manipulate hydraulic fracture geometry for a geomechanical pumped storage system to optimize system performance. In embodiments, optimal system performance may be achieved by providing substantially long, wide, and horizontal hydraulic fractures. This hydraulic fracture geometry may be capable of delivering substantial flow rates, reservoir pressures, and fluid storage capacity.

In embodiments, the hydraulic fractures present in the system may be generated or pre-existing for the purpose of being utilized for energy storage, or rather for stimulating oil and hydrocarbon production in the well. The hydraulic fractures, whether generated or pre-existing, may be present in rock matrices of ranging permeability (e.g., low permeability to high permeability). In any situation, the operator may be capable of manipulating the hydraulic fracture geometry.

Figure 1:
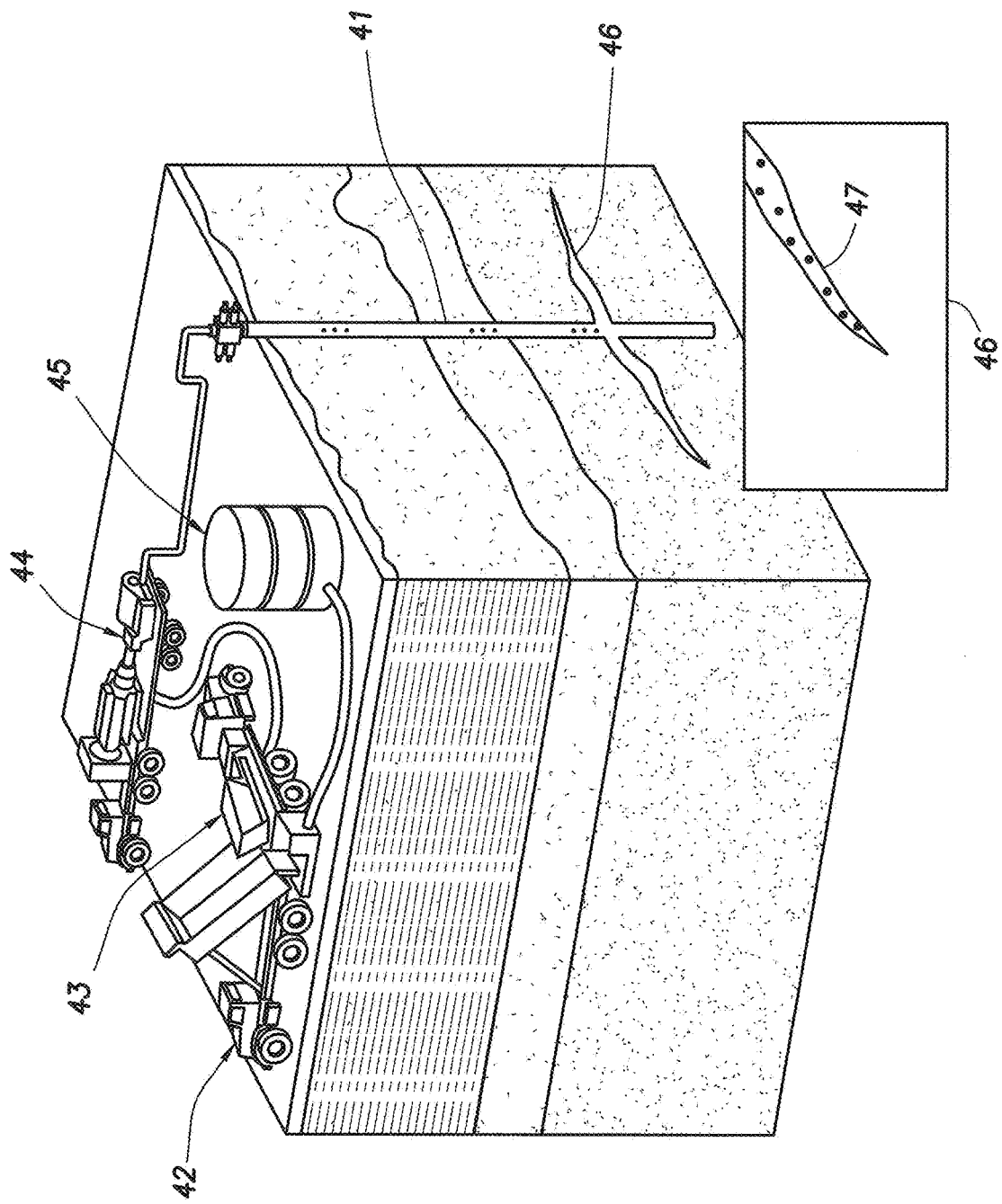
FIG. 1 illustrates a system for generating hydraulic fractures that may be utilized by a geomechanical pumped storage system in accordance with one embodiment of the present invention.

FIG. 1 illustrates a hydraulic fracturing system disposed at a well site suitable for generating hydraulic fractures that may be utilized by a geomechanical pumped storage system. The hydraulic fracturing system may comprise a sand truck 42, a storage tank 45, a blender truck 43, and high-pressure pumps 44. In embodiments, sand truck 42 may be any truck suitable for providing sand or other materials such as, without limitation, polymers, pre-formed particle gels (PPGs), viscosifying agents, clays, or combinations thereof, at the well site. Storage tank 45 may be any tank suitable for mixing and/or storing fracturing fluid such as, without limitation, water. In order to generate hydraulic fractures that may be utilized by a geomechanical pumped storage system, the fracturing fluid disposed in storage tank 45 may be drawn to blender truck 43 to be mixed with the sand or other materials provided by sand truck 42. This mixture may then be injected into a well 41, which may be any suitable oil and gas well drilled into a subsurface rock formation, using high-pressure pumps 44. In embodiments, the mixture may be injected at any pressure sufficient for forming one or more hydraulic fractures 46 around well 41. The volume injected may be selected to be a substantial fraction of the total working volume of the geomechanical pumped storage system. In an optional embodiment, after the formation of one or more hydraulic fractures 46, proppant particles 47 may be pumped into one or more hydraulic fractures 46 to maintain fracture formation. Further after formation, one or more hydraulic fractures 46 may be drained of any fluids. In embodiments, the requisite pressure to form one or more hydraulic fractures 46 in the subsurface rock formation may generally have a linear dependency on well depth. Further, the requisite pressure may be any pressure above the fracture gradient. In some embodiments, a typical fracture gradient may be about 0.8 psi per foot of well depth. Therefore, by way of example, a 3,000 foot well may require a pressure of about 2,400 psi at the rock face to generate a hydraulic fracture. In addition to requisite pressure, well depth may influence the orientation of one or more hydraulic fractures 46. For example, hydraulic fractures generated in shallow wells (i.e., wells up to 1,000 to 2,000 feet deep) may be horizontally oriented, while hydraulic fractures generated in wells at greater depths may be vertically oriented.

Using the hydraulic fracturing system, an operator may generate one or more hydraulic fractures 46 to generally be horizontally oriented and symmetrically disposed within the subsurface rock formation about well 41 with fracture lengths comparable to or larger than their depth below the surface of well 41. While hydraulic fractures with different orientations, positionings, or lengths may be used, performance of the geomechanical pumped storage system may be adversely affected. Further, the subsurface rock formation may be substantially impermeable or selected to be substantially impermeable so as to minimize leakage and allow for maximum fracture length. In embodiments, one or more hydraulic fractures 46 may be disposed in dense laminated shales. While other rock fabrics may be used, performance of the geomechanical pumped storage system may be adversely affected.

After generating and/or draining one or more hydraulic fractures 46 as desired, an operator may increase the fracture width of one or more hydraulic fractures 46. For a given depth and fracture length, the ability to increase fracture width may generally be dependent upon the rock's fracture toughness (i.e., the fracture's ability to inhibit further propagation at its tip). As such, the operator may need to increase the apparent fracture toughness of the subsurface rock formation by selectively plugging or screening out the tip or tips of one or more hydraulic fracture 46 in order to increase the fracture width. Through the exploitation and extension of one or more hydraulic fractures 46, LCMs and conformance control materials and methods may arrest the growth of one or more hydraulic fractures 46 and subsequently inflate one or more hydraulic fractures 46 to widths beyond those achievable with native fracture toughness. To increase the apparent fracture toughness of the subsurface rock formation, a tip screen-out (TSO) mixture may be injected into well 41 to fill, coat, or line one or more hydraulic fractures 46. In particular, the TSO mixture may plug or screen-out the tip of each one or more hydraulic fractures 46.

In some embodiments, the TSO mixture may comprise a synthetic or biologically-derived hydrophilic polymer and one or more crosslinking agents. When mixed, the hydrophilic polymer and the one or more crosslinking agents may be capable of forming low-density hydrogels. In embodiments, the concentrations of the hydrophilic polymer and the one or more crosslinking agents may be selected to ensure low viscosity and low density to ease injection and prevent settling. Further, the concentrations may be selected to achieve viscous or rigid gels upon completion of injection. In embodiments, the hydrophilic polymer may be based on an anionic, partially hydrolyzed, polyacrylamide at a concentration, including the one or more crosslinking agents, from about 0.01 wt. % to about 10 wt. % in water. Alternatively, the concentration of the hydrophilic polymer, including the one or more crosslinking agents, may be from about 0.1 wt. % to about 1 wt. % in water, or further alternatively about 0.5 wt. % in water. The one or more crosslinking agents may be selected from a group including, but not limited to, compounds comprising polyvalent metal cations, such as, without limitation, aluminum sulfate, chromium dichloride, chromium trichloride, and organic polyamines. In embodiments, the organic polyamines may be, without limitation, polyethylene imine or amine terminated polymers of ethylene oxide. Further, the concentration of the organic polyamines may be from about 0.001 wt. % to about 10 wt. % in water. Alternatively, the concentration of the organic polyamines may be from about 0.01 wt. % to about 1 wt. % in water, or further alternatively about 0.5 wt. % in water. In embodiments, the polyvalent metal cations may also include, without limitation, Calcium(II), Chromium(II), Chromium(III), Aluminum(III), Iron(III), Titanium (IV), Zirconium(IV), or any combinations thereof. One skilled in the art may recognize any number of functionally equivalent combinations of materials, including even cationic polymers and anionic crosslinking agents, as well as neutral polymers and neutral organic crosslinking agents. In embodiments, the one or more crosslinking agents may be a Chromium(III) complex with a carboxylic acid or acids including, without limitation, acetic acid, which may generate a range of gels (e.g., viscous to rigid) over a range of time periods (e.g., hours to weeks) depending on the hydrophilic polymer concentration and temperature.

In order to plug or screen-out the tip of each one or more hydraulic fractures 46, the TSO mixture comprising the hydrophilic polymer and the one or more crosslinking agents may be injected into well 41 by any suitable method. In some embodiments, the hydrophilic polymer and the one or more crosslinking agents may be mixed at the surface of well 41 just before injection. In such an embodiment, the one or more crosslinking agents may be timely inhibited from crosslinking the hydrophilic polymer so as to not form the low-density hydrogels until properly placed in one or more hydraulic fractures 46. In another embodiment, the hydrophilic polymer and the one or more crosslinking agents may be injected separately into well 41. In such embodiments, the hydrophilic polymer and the one or more crosslinking agents may be mixed in-situ, thereby forming the low-density hydrogels in-situ. In some embodiments involving separate injection, the one or more crosslinking agents may be injected into well 41 prior to the hydrophilic polymer. In this embodiment, the one or more crosslinking agents may be selected based on ability to adhere to the rock surface of hydraulic fractures, and therefore may promote adhesion via metal ions of the subsequently formed low-density hydrogels to the rock surface of one or more hydraulic fractures 46. The low-density hydrogels, however formed, may be transported along one or more hydraulic fractures 46 to bridge, dewater, and/or form a packed bed of hydrogel material at each tip. As a result, apparent fracture toughness may be increased and fluid flow to the tip or tips of one or more hydraulic fractures 46 may be substantially stopped, thus arresting further fracture growth.

In some embodiments, to aid in arresting further fracture growth, an operator may optionally augment the low-density hydrogels using a mixture of traditional LCMs. Augmenting the low-density hydrogels may aid in achieving a desired sized to approximately match or slightly exceed the fracture width of one or more hydraulic fractures 46, thus achieving bridging and/or forming of a packed bed at each tip. In embodiments, the traditional LCMs may include, without limitation, bentonite clay, mineral fibers, silica flour, or any combinations thereof.

In other embodiments, the hydrophilic polymer may be fully crosslinked by the one or more crosslinking agents and in the form of PPGs prior to injection into well 41. In such embodiments, the PPGs may be desiccated and crushed to selected sizes and injected into well 41. Further, the PPGs may be swollen with water prior to injection into well 41 or after injection into well 41. In embodiments, the PPGs are pre-swollen prior to injection into well 41. Similarly to the low-density hydrogels, the PPGs may be transported along one or more hydraulic fracture 46 to bridge, dewater, and/or form a packed bed of hydrogel material at each tip. Once again, this may increase the apparent fracture toughness and substantially stop fluid flow to the tip or tips of one or more hydraulic fractures 46, thus arresting further fracture growth. In embodiments, the PPGs may be injected at a range from about 0.1 wt. % to about 2 wt. % in water. To enhance performance and space-filling abilities, the PPGs injected may be a mixture of a distribution of complementary particle sizes. In embodiments, the distribution of particle sizes of the PPGs may range from about 10 microns to about 1 centimeter. In alternative embodiments, the particle sizes of the PPGs may be greater than 1 centimeter. Further, to enhance performance and space-filling abilities, the PPGs may be injected into well 41 along with clays or other materials. In embodiments, the clays or other material may be, without limitation, bentonite clay, mineral fibers, silica flour, or any combinations thereof. The clays or other materials may be added in the amount from about 1 pound per barrel of water up to about 30 pounds per barrel of water.

Following the bridging of one or more hydraulic fractures 46 via low-density hydrogels or PPGs, apparent fracture toughness may substantially increase and further fracture growth may be substantially arrested. As such, the geomechanical pumped storage system may operate at optimal performance. For instance, an operator may inject a working fluid into the system, and due to the disabling of fracture growth the working fluid may inflate one or more hydraulic fractures 46 and result in maximum fluid storage capacity. Enabled by the low-density hydrogels or the PPGs, the injected working fluid may serve to increase the fracture width of one or more hydraulic fractures 46, without extending the fracture length. Further, the system may deliver substantially high reservoir pressures and substantially high flow rates. Thus, hydraulic performance of one or more hydraulic fractures 46 may be improved and the fracture width may be greater than that achievable with only the native fracture toughness of the subsurface rock formation. In embodiments, the injected working fluid may be any suitable fluid such as, without limitation, water, salt water, or the like. In some embodiments, modifiers may be added to the working fluid to promote adhesion of PPGs to each other. The modifiers may include, without limitation, cationic polymers like PEI (polyethyleneimine), polydiallyldimethylammonium chloride (polyDADMAC), cationic polyacrylates, chitosan, or any combinations thereof.

To further illustrate various illustrative embodiments of the present invention, the following examples are provided.

Example 1

In a demonstration of an embodiment of the present method, a horizontal fracture at a depth of 1210 feet was first created using 50 bbl. of water viscosified with guar gum. The fracture was monitored during a shut in for 24 hours and then depressurized. The fracture was then inflated with 100 bbl. of water loaded with a mixture of pre-swollen 1-2 mm and sub-mm pre-formed polyacrylamide PPG particles. The PPG mixture was augmented with bentonite and mineral fiber. The injection pressure was observed to increase during injection, as opposed to a decreasing profile as expected for a short horizontal hydraulic fracture. The fracture was observed during shut in, then a series of similar injections of 250 bbl. each were performed up to a total of 1000 bbl. After each stage the pressure was monitored and then flowback tested through a fixed choke. At each stage, the injection and shut-in pressures increased while the flow back volumes increased roughly in proportion to the net pressure in the fracture. The net pressure in the fracture during shut-in after 1000 bbl. was observed to be over two times greater than the overburden pressure expected at a depth of 1210 feet. These results are consistent with an increase of fracture width at a constant fracture length.

Example 2—Engineered Tip-Screen Out

Figure 2:
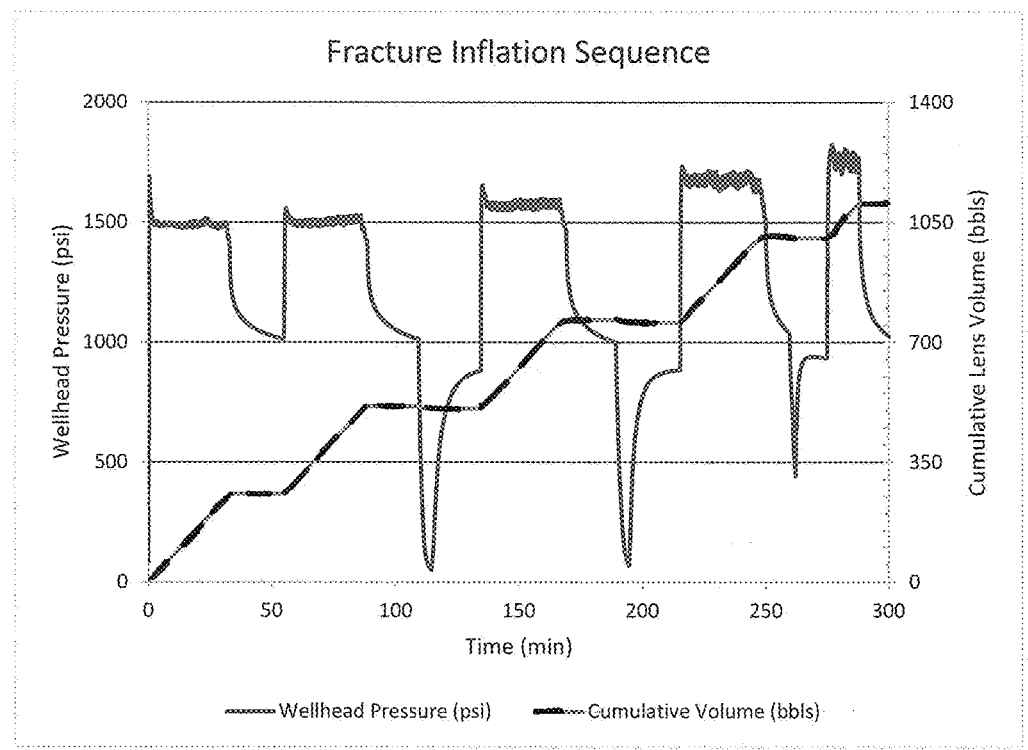
FIG. 2 illustrates a pressure response graph of a geomechanical pumped storage system in accordance with one embodiment of the present invention.

A horizontal fracture formed at 1210 feet was evaluated for potentially engineering tip-screen out in pre-formed fractures using a mixture of lost circulation and conformance control materials. This class of materials is used in the oil field to plug thief zones encountered during drilling or during water flood operations, and comprise particles and fibers ranging in size from microns to centimeters. Typical materials include bentonite clay, crushed walnut shells, mineral fibers, and the swellable PPGs, among many others. A candidate mixture was supplied while inflating the horizontal fracture in stages up to 1000 bbl. of fluid. The pressure response, shown in FIG. 2, is indicative of a horizontal fracture with expanding width at a nominally constant length. A freely inflating horizontal fracture typically displays a monotonically decreasing net pressure as the fracture extends, asymptotically approaching the overburden pressure. Instead, this system displays increasing pressure with volume. In the small radius regime, the fracture width (and volume) is proportional to net pressure (Hooke's law spring behavior). Further, the pinch times for the three stages tested increased monotonically with volume: 52, 72 and 101 seconds, respectively. This result demonstrates an effective means for arresting fracture growth and increasing the effective fracture toughness of the rock matrix. Also, it is noted that in this system the overburden pressure expected is about 700 psi; the effective net pressure achieved was easily two times above overburden pressure.

In addition to optimizing energy storage and power generation in a geomechanical pumped storage system, this method for manipulating hydraulic fracture geometry may improve mineral resource production. For instance, following the bridging of one or more hydraulic fractures 46 via low-density hydrogels or PPGs, with fracture toughness substantially increased and further fracture growth substantially arrested, an operator may inject a working fluid comprising any suitable proppant bed into the system. Due to the disabling of fracture growth, the working fluid comprising the proppant bed may prop and inflate one or more hydraulic fractures 46 to widths beyond those previously achievable and allow for high conductivity to improve mineral resource production.

Although the present invention and its advantages have been described in detail, it should be understood that various changes, substitutions and alterations may be made herein without departing from the spirit and scope of the invention as defined by the appended claims.

What is claimed is:

1. A tip screen-out mixture comprising:
water;
a hydrophilic polymer of anionic, polyacrylamide, wherein the hydrophilic polymer is hydrolized at least in part, and further wherein the hydrophilic polymer comprises a hydrophilic polymer concentration in the water; and
one or more crosslinking agents selected from a group of compounds consisting of polyvalent metal cations, wherein the one or more crosslinking agents comprises a crosslinking agent concentration in the water;
wherein the hydrophilic polymer concentration and the crosslinking agent concentration are each between 0.01 wt. % and 10 wt. % in the water, and further wherein the temperature of the hydrophilic polymer is selected to timely inhibit crosslinking of hydrogels until properly disposed in one or more hydraulic fractures.

2. The tip screen-out mixture of claim 1, wherein the hydrophilic polymer is synthetic or biologically-derived.

3. The tip screen-out mixture of claim 1, wherein the hydrophilic polymer and the one or more crosslinking agents form the hydrogels when mixed together.

4. The tip screen-out mixture of claim 3, wherein the hydrophilic polymer concentrations and the crosslinking agents concentration are each selected to form the hydrogels at a desired viscosity and density and in a desired time period.

5. The tip screen-out mixture of claim 1, wherein the polyvalent metal cations are aluminum sulfate, chromium dichloride, chromium trichloride, or organic polyamines.

6. The tip screen-out mixture of claim 5, wherein the organic polyamines are polyethylene imine or amine terminated polymers of ethylene oxide.

7. The tip screen-out mixture of claim 5, wherein concentration of the organic polyamines is between about 0.01 wt. % and about 1 wt. % in water.

8. The tip screen-out mixture of claim 1, wherein the polyvalent metal cations are Calcium (II), Chromium (II), Chromium (III), Aluminum (III), Iron (III), Titanium (IV), Zirconium (IV), or any combinations thereof.

9. The tip screen-out mixture of claim 1, wherein the one or more crosslinking agents is a Chromium (III) complex with a carboxylic acid or acids.

10. The tip screen-out mixture of claim 9, wherein the carboxylic acid is acetic acid.

* * * * *

UNITED STATES PATENT AND TRADEMARK OFFICE
CERTIFICATE OF CORRECTION

| | | |
|---|---|---|
| PATENT NO. | : 12,264,569 B2 | Page 1 of 1 |
| APPLICATION NO. | : 18/383188 | |
| DATED | : April 1, 2025 | |
| INVENTOR(S) | : Dmitry Kosynkin, Howard K. Schmidt and Scott Wright | |

It is certified that error appears in the above-identified patent and that said Letters Patent is hereby corrected as shown below:

In the Claims

Claim 4, Line 2 reads "concentrations" but should read -concentration-. Also Claim 4, Line 3 reads "agents" but should read -agent-.

Signed and Sealed this
Twenty-fourth Day of June, 2025

Coke Morgan Stewart
*Acting Director of the United States Patent and Trademark Office*